(12) United States Patent     (10) Patent No.:     US 7,903,720 B2
Covell et al.                  (45) Date of Patent:    Mar. 8, 2011

(54) ALTERNATIVE DIRECT SEQUENCE SPREAD SPECTRUM SYMBOL TO CHIP MAPPINGS AND METHODS FOR GENERATING THE SAME

(75) Inventors: John Covell, South Burlington, VT (US); Radoslaw Romuald Zakrzewski, South Burlington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 856 days.

(21) Appl. No.: 11/818,031

(22) Filed: Jun. 13, 2007

(65) Prior Publication Data

US 2008/0310482 A1    Dec. 18, 2008

(51) Int. Cl.
    *H04B 1/00*    (2006.01)
(52) U.S. Cl. .......................... 375/146; 375/130; 375/140
(58) Field of Classification Search .................... 375/146
    See application file for complete search history.

(56) References Cited

U.S. PATENT DOCUMENTS

| | | | |
|---|---|---|---|
| 6,590,889 B1 * | 7/2003 | Preuss et al. ................... 370/342 |
| 6,606,349 B1 * | 8/2003 | Kudhrethaya et al. ......... 375/150 |
| 6,744,807 B1 * | 6/2004 | Linde et al. .................... 375/140 |
| RE40,231 E * | 4/2008 | Snell et al. ..................... 375/130 |
| 2003/0112849 A1 * | 6/2003 | Gorday et al. ................. 375/130 |
| 2005/0195732 A1 * | 9/2005 | Huh et al. ....................... 370/206 |
| 2005/0281318 A1 * | 12/2005 | Neugebauer .................. 375/134 |
| 2009/0110033 A1 * | 4/2009 | Shattil ............................ 375/141 |
| 2009/0290660 A1 * | 11/2009 | Neugebauer .................. 375/340 |

* cited by examiner

*Primary Examiner* — David C Payne
*Assistant Examiner* — Erin M File
(74) *Attorney, Agent, or Firm* — Scott D. Wofsy; Edwards Angell Palmer & Dodge LLP

(57) ABSTRACT

Alternative direct sequence spread spectrum symbol to chip mappings and methods for generating the same for use in a direct sequence spread spectrum wireless protocol and embedded in a transceiver chip used by wireless subsystems are provided. The present invention discloses alternative symbol to chip mappings that are orthogonal or nearly orthogonal to the N/2 unused chip sequences defined by a standard transmission protocol. The present invention is advantageous because it provides for an increased number of users and better reliability for wireless subsystems operating in increasingly overcrowded frequency bands. Other advantages of the present invention include a reduction in the negative effects of clear channel assessment including delayed or cancelled signal transmission and interference for wireless subsystems that transmit time-sensitive data.

17 Claims, 3 Drawing Sheets

| 4-bit symbols $s_i$ | 32-chip sequences $x_{i,j}$ |
|---|---|
| 0 0 0 0 | 1 1 0 1 1 1 1 0 0 0 1 1 0 1 1 1 1 1 0 0 0 0 1 1 0 1 0 0 0 1 0 0 0 1 |
| 0 0 0 1 | 1 0 1 1 0 1 1 1 1 1 0 0 0 1 1 0 1 1 0 0 0 0 0 0 1 0 1 1 0 0 0 1 |
| 0 0 1 0 | 0 0 0 0 1 0 1 0 1 0 1 1 1 0 1 1 0 1 1 1 0 0 0 1 1 0 0 1 0 1 0 1 |
| 0 0 1 1 | 1 0 1 0 1 0 1 1 0 0 1 0 0 0 1 1 1 1 0 0 0 1 0 1 0 1 1 0 1 0 1 0 |
| 0 1 0 0 | 1 0 0 1 1 1 1 0 1 1 1 1 0 0 1 0 1 0 1 1 0 1 1 0 0 1 0 0 0 0 0 0 |
| 0 1 0 1 | 1 1 1 1 0 0 1 0 0 0 0 0 1 0 0 0 1 1 0 1 0 1 1 1 1 0 0 1 0 0 1 0 1 |
| 0 1 1 0 | 0 1 0 1 1 1 0 1 0 0 0 1 1 0 0 1 1 1 0 1 0 1 0 0 1 0 1 0 1 0 0 1 |
| 0 1 1 1 | 0 1 1 0 0 1 0 1 1 0 1 0 0 0 0 1 0 1 1 0 1 1 1 0 1 1 0 0 0 0 1 1 |
| 1 0 0 0 | 0 1 0 1 0 0 0 0 1 1 0 0 1 1 1 0 1 0 1 0 0 1 1 1 1 0 1 0 1 0 1 0 |
| 1 0 0 1 | 0 0 1 1 1 0 1 1 0 1 1 1 0 1 0 0 0 0 1 0 0 0 1 1 0 0 0 1 1 0 1 1 |
| 1 0 1 0 | 1 0 1 0 1 0 0 1 1 1 0 0 1 0 0 0 0 0 0 1 1 1 0 1 1 1 0 0 1 1 0 1 |
| 1 0 1 1 | 1 1 0 0 0 0 0 0 1 0 1 1 1 1 0 1 1 1 0 0 1 0 1 0 0 0 0 1 1 1 1 0 |
| 1 1 0 0 | 0 1 0 1 0 1 0 1 1 1 0 1 0 1 0 1 0 0 0 1 0 0 1 1 1 1 0 1 0 1 0 0 |
| 1 1 0 1 | 1 1 1 0 1 1 0 0 0 0 0 0 0 0 1 0 1 0 0 1 1 0 1 0 1 1 1 1 0 1 1 0 |
| 1 1 1 0 | 0 0 0 0 0 1 1 0 0 1 0 1 1 1 0 0 0 1 1 1 1 1 0 0 0 1 1 0 1 1 1 0 |
| 1 1 1 1 | 0 0 1 1 0 0 1 1 1 0 0 0 1 0 1 1 0 0 1 1 1 0 1 0 0 1 1 1 1 0 0 0 | ic

ALTERNATIVE DIRECT SEQUENCE SPREAD SPECTRUM SYMBOL TO CHIP MAPPINGS AND METHODS FOR GENERATING THE SAME

BACKGROUND OF THE INVENTION

1. Field of the Invention

The present invention relates to alternative direct sequence spread spectrum symbol to chip mappings for wireless subsystems and methods for generating the same.

2. Background of the Related Art

Proliferation of wireless devices using standard transmission protocols on the market may be both advantageous and disadvantageous from the point of view of development of certain wireless subsystems. On one hand, wide availability of commercial off-the-shelf (COTS) wireless transceiver chips may allow lowering hardware costs, thus making wireless approach economically feasible. On the other hand, rapidly increasing numbers of users in the unlicensed frequency bands makes accidental interference a very likely problem.

In a typical case, a wireless communication system is operating in a frequency band divided into several channels. If transmission from another user is detected, it is then conceptually possible to switch to another, yet unoccupied channel. However, this channel switching approach may be not sufficiently reliable in practice. Synchronization of multiple devices is potentially difficult, particularly if the presence of interferers in the currently used channel makes it difficult to coordinate simultaneous switch of all concerned devices to the same channel.

An even more critical issue is the availability of unoccupied channels. Typically, the number of such channels in a given frequency band will be rather small. Therefore, it is quite possible that all of the channels will be occupied by other communication systems using the same protocol. As use of wireless communications becomes more widespread, the more likely it is that a channel will remain occupied, even for wireless subsystems that require immediate access.

The issue of overcrowding the available channels by multiple users is particularly significant for communication protocols that employ collision avoidance of simultaneously transmitted signals through clear channel assessment (CCA). For example, the 802.15.4 IEEE standard uses the CCA approach to detect if a transceiver may start sending data as described in the Institute of Electrical and Electronics Engineers, Inc., IEEE Std. 802.5.4-2003, *IEEE Standard for Information Technology—Telecommunications and Information Exchange between Systems—Local and Metropolitan Area Networks—Specific Requirements—Part 15.4: Wireless Medium Access Control (MAC) and Physical Layer (PHY) Specifications for Low Rate Wireless Personal Area Networks (WPANs)*. New York: IEEE Press 2003.

Depending on the particular CCA mode employed at the moment, the transceiver first listens to the channel and tries to detect either energy above a threshold, or any signal using the 802.15.4 modulation protocol, or both. If such a source is detected, the transceiver backs off for a random time and tries again. This means that the presence even of an extremely weak signal source may prevent a transceiver from being able to initiate its own transmission for an unknown amount of time. In the worst-case scenario, the transceiver may wait forever for the other source to stop emitting its signal. This inherent delay is known as CCA vulnerability of a wireless system. In the case of wireless aircraft subsystems, CCA vulnerability is highly undesirable. Aircraft subsystems such as, flight control systems, aircraft navigation systems or even in-flight entertainment systems, for example, can potentially experience an unknown time restriction on the ability to transmit wirelessly. And, because of the stringent reliability requirements for these aircraft subsystems and other analogous systems, even occasional delay or cancellation of data transmission due to collision avoidance techniques, like CCA, may be completely unacceptable.

In a system with no economic constraints, using a non-COTS proprietary communication protocol created specifically for a given subsystem, either with no CCA mechanism at all or such that only detects transmissions using the proprietary protocol designed only for a given wireless system would yield significantly improved reliability. However, in view of the relatively low production volumes for some wireless subsystems, like wireless aircraft subsystems, for example, the necessary development investment makes this proprietary approach economically infeasible. In view of these concerns, a modification of an existing standard protocol that would allow use of most of the already existing infrastructure while simultaneously reducing the negative impact of CCA vulnerability is an alternative. One such modification is that of an alternative symbol to chip mapping that may be embedded in a transceiver used by a wireless subsystems that employ direct sequence spread spectrum signal modulation.

SUMMARY OF THE INVENTION

The subject invention is directed to alternative direct sequence spread spectrum symbol to chip mappings for modifying an existing standard protocol used by wireless subsystems (e.g. aircraft subsystems) and methods for generating the same. Such a modification is advantageous because it provides for an increased number of users who can transmit in a given frequency channel as well as a cost-effective reduction of CCA vulnerability, among other benefits that will be described herein. The first method is achieved through the steps of identifying a set of nearly orthogonal pseudo random noise sequences that are used by a standard transmission protocol, generating a plurality of candidate sets of pseudo random noise sequences that are nearly orthogonal to said set of nearly orthogonal pseudo random noise sequences that are used by said standard transmission protocol, and choosing at least one of said plurality of candidate sets of pseudo random noise sequences to serve as an alternative direct sequence spread spectrum symbol to chip mapping that may be embedded in a transceiver.

Various aspects of the various embodiments of the invention are described in the dependent claims. In one embodiment, the step of identifying a set of nearly orthogonal pseudo random noise sequences comprises identifying a set of N/2 chip sequences $Z_i$ (wherein i=1 ... N/2) of length N that are used by a direct sequence spread spectrum standard transmission protocol. In this embodiment, the step of generating a plurality of candidate sets of pseudo random noise sequences comprises generating a plurality of candidate sets, each containing N/2 sequences $X_j$ (wherein j=1 ... N/2) of length N, such that a mutual mean orthogonal distance between each of the sequences within said candidate sets is defined by $|X_i - X_j| \geq N/2 - K$ (wherein i,j=1 ... N/2, i≠j). Lastly, the step of choosing at least one set of pseudo random noise sequences includes choosing a candidate set $X_m$ based on optimizing the mutual mean orthogonal distance between each of the N/2 chip sequences within the plurality of candidate sets $X_j$.

In other embodiments, the variable K is defined as a small integer, for example, K can be selected as 0, 2 or greater as described in the dependent claims. The selection of K determines the relaxed orthogonality characteristic of a candidate sequence as will be described herein. In one embodiment, the step of generating a plurality of N/2 candidate sets $X_j$ includes the step of defining N as 32 and K as 0. In another embodiment, the step of generating a plurality of N/2 candidate sets $X_j$ includes the step of defining N as 32 and K as 2. In this embodiment, a candidate set $X_m$ can be defined such that:

$X_m =$ 1101110001101111000011010001  
1011011110001101100000010110001  
0000101011101101110001100101010  
1010101100100011110001010110101010  
10011110111100101011011001000000  
1111001000010001101011110100101  
0101110100011001110101010010101001  
0110010110100001011011101100011  
0101000011001101010011111010101010  
0011101101110100001000110001011  
1010100111001000000011101110011101  
11000000101111011100101000011110  
01010101110101010000100111111010100  
11101100000000101001101011110110  
0000011001011100011111100011011110  
00110011100010110011101001111000

The second method is similar to the first with a different generating step. This method comprises the steps of identifying a set of nearly orthogonal pseudo random noise sequences that are used by a standard transmission protocol, generating a plurality of candidate sets of pseudo random noise sequences that are strictly orthogonal to said set of nearly orthogonal pseudo random noise sequences that are used by said standard transmission protocol, and choosing at least one of said plurality of candidate sets of pseudo random noise sequences to serve as an alternative direct sequence spread spectrum symbol to chip mapping.

Various embodiments of this second method are described in the dependent claims. In one embodiment, the step of identifying a set of nearly orthogonal pseudo random noise sequences comprises identifying a set of N/2 chip sequences $Z_i$ (wherein i=1 ... N/2) of length N that are used by a direct sequence spread spectrum standard transmission protocol. In this embodiment, the step of generating a plurality of candidate sets of pseudo random noise sequences comprises generating a plurality of candidate sets, each consisting of N/2 sequences $X_j$ (wherein j=1 ... N/2) of length N, such that a mutual mean distance between each of the sequences within said candidate sets satisfies $|X_i - X_j| \geq N/2$ (wherein i, j=1 ... N/2, i≠j). Lastly, the step of choosing at least one pseudo random noise sequences includes choosing a candidate set $X_m$ based on optimizing the mutual mean distance between each of the N/2 chip sequences within the plurality of candidate sets $X_j$.

In other embodiments, the step of generating a plurality of candidate sets $X_j$, each consisting of N/2 sequences, includes the step of defining N as 32. However, N can be defined as any even integer greater than or equal to the symbol length used by a given standard protocol. In yet another embodiment, the second method described above is employed such that said wireless subsystems comprise wireless aircraft subsystems. (Note that the indices i, j, and m are used throughout applicant's disclosure to indicate that a pseudo random noise sequences consists of a set of sequences that can be indexed by 1 ... N/2. For example, in the 802.15.4 standard, there are 16 sequences for any given $Z_i$.)

Corresponding to the methods described above, there are two primary types of alternative direct sequence spread spectrum symbol to chip mappings disclosed herein. The first alternative direct sequence spread spectrum symbol to chip mapping for wireless subsystems disclosed herein comprises a first set of pseudo random noise sequences that are nearly orthogonal to a second set of nearly orthogonal pseudo random noise sequences used by a standard transmission protocol. This symbol to chip mapping has pseudo random noise sequences of the same length as the length of the second set of pseudo random noise sequences. Here, the mutual mean distance between each sequence of the first set of pseudo random noise sequences may be selected (e.g. mutual mean distance=14). One possible symbol to chip mapping in this first alternative is shown below (same as above).

| Symbol | Chip Mapping |
|---|---|
| 0000 | 11011100011011110000110100010001 |
| 0001 | 10110111110001101100000010110001 |
| 0010 | 00001010101110110111000110010101 |
| 0011 | 10101011001000111100010101101010 |
| 0100 | 10011110111100101011011001000000 |
| 0101 | 11110010000100011010111100100101 |
| 0110 | 01011101000110011101010010101001 |
| 0111 | 01100101101000010110111011000011 |
| 1000 | 01010000110011101010011110101010 |
| 1001 | 00111011011101000010001100011011 |
| 1010 | 10101001110010000001110111001101 |
| 1011 | 11000000101111011100101000011110 |
| 1100 | 01010101110101010001001111010100 |
| 1101 | 11101100000000101001101011110110 |
| 1110 | 00000110010111000111110001101110 |
| 1111 | 00110011100010110011101001111000 |

The second alternative direct sequence spread spectrum symbol to chip mapping for wireless subsystems disclosed herein comprises a first set of pseudo random noise sequences that are strictly orthogonal to a second set of nearly orthogonal pseudo random noise sequences used by a standard transmission protocol.

Both the alternative direct sequence spread spectrum symbol to chip mappings and methods for generating the same described herein are particularly advantageous for embedding in transceivers used in wireless subsystems such as aircraft subsystems (e.g. flight control systems, condition monitoring systems, and aircraft navigation systems) due to the sensitive data transmitted and the stringent reliability requirements of communications involving aircrafts.

These and other objects and advantages of the present invention will become more apparent from the accompanying drawings and descriptions.

BRIEF DESCRIPTION OF THE DRAWINGS

So that those having ordinary skill in the art to which the subject invention pertains will more readily understand how to use and perform the novel aspects disclosed herein, preferred embodiments thereof will be described in detail hereinbelow with reference to certain drawings and figures, wherein.

DETAILED DESCRIPTION OF THE INVENTION

Figure 1:
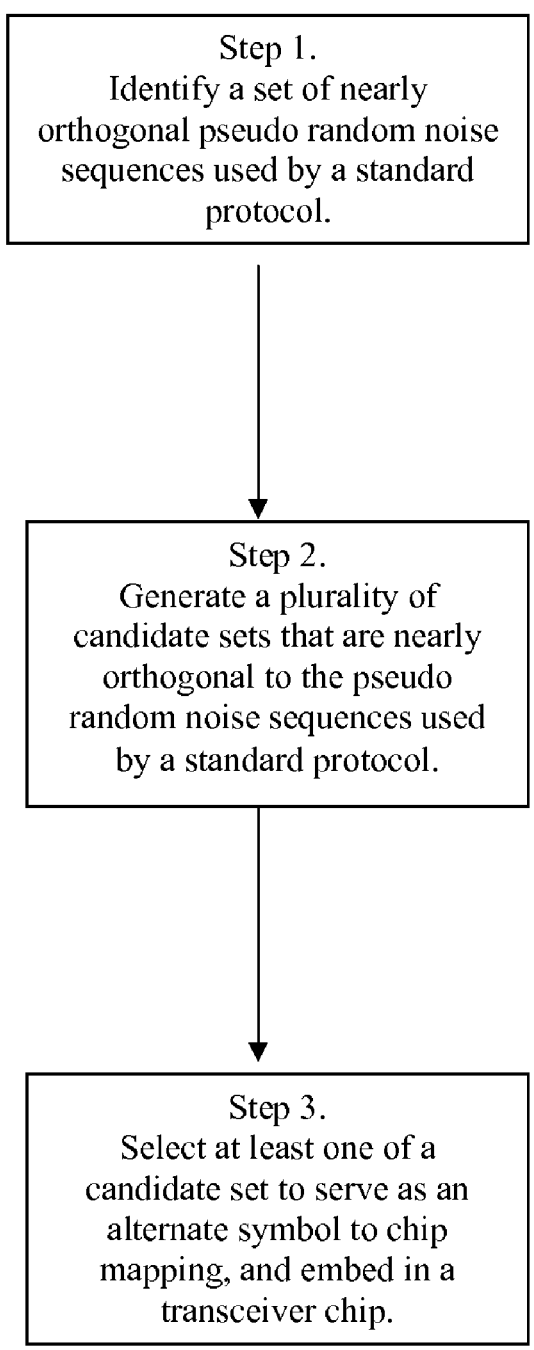
FIG. 1 is a flow chart depicting operative steps of a preferred embodiment of the first method of the present invention.

1. Introduction to Orthogonality and Bit Error Rate

This section briefly discusses the direct sequence spread spectrum technique, as implemented in the IEEE 802.15.4 standard as a sample case. Its noise rejection and error correction capabilities stem from the way data symbols are translated into pseudo random noise sequences or chip sequences. Before coding, data bits (binary numbers, i.e. zeros or ones) are grouped into 4-bit symbols (half-bytes) and these are in turn mapped into chip sequences, each 32 chips long. This binary data is in turn used to modulate a carrier wave or wireless transmission signal between users in a wireless subsystem. Because 32 chips are used to code 4 bits of data, this effectively is a case of rate ⅛ forward error correction code. The 802.15.4 IEEE standard defines the 16 specific chip sequences and their assignment to the 16 possible data symbols (half-bytes). The specific choice of those sequences controls the error correction performance of the protocol. These chip sequences are referred to in the standard as "nearly orthogonal pseudo random noise sequences."

Two binary pseudo random noise sequences of length N are strictly orthogonal if they differ at exactly N/2 positions in the chipping sequence. If pseudo random noise sequences in a symbol to chip mapping are 32 chips long, strict orthogonality means that the distance between any two of them is equal exactly to 16, in other words any two chip sequences differ in exactly 16 positions. For strictly orthogonal pseudo random noise sequences, with N=32, the minimum mutual distance is the same as the mean mutual distance, namely 16. This would imply that, an error in reception of any 7 chips by a transceiver would still allow correct decoding of the original data symbol.

In the 802.15.4 IEEE standard, the pseudo random noise sequences defined in the protocol are not strictly orthogonal. Their actual distances range between a minimum mutual distance of 12 and a maximum mutual distance of 20. The mean mutual distance is approximately 17.067 as indicated below.

$$\min_i |z_i - z_j| = 12$$

$$\frac{1}{15} \sum_{j \neq i} |Z_i - Z_j| = \frac{256}{15} \neq 17.067$$

This means that correct decoding is guaranteed for 5 or fewer chip errors, but 6 erroneous chips will occasionally result in an incorrectly decoded symbol. In fact, the 802.15.4 chip sequences are quite far from strict orthogonality. Consequently the bit error rates achievable within the 802.15.4 IEEE standard are noticeably worse than what could be achieved with another ("more orthogonal") set of chip sequences.

Because the chip sequences are not strictly orthogonal, it is impossible to define a set of 16 alternative sequences that would be simultaneously orthogonal to each one of the original 16 chip sequences $Z_i$ defined in the standard, since such a set does not exist. Therefore, it is necessary to relax the orthogonality requirement. One such possible relaxation is to require that the new candidate sequences $X_i$ are only nearly-orthogonal to the chip sequences used by a standard protocol. That is, instead of requiring that their mutual distances are $$|x_i - z_j| = \frac{N}{2} \quad i = 1 \ldots N/2, \, j = 1 \ldots N/2$$

the relaxed requirement would be that $$|x_i - z_j| \geq \frac{N}{2} - K \quad i = 1 \ldots N/2, \, j = 1 \ldots N/2$$

where K is a small positive integer. For example, in the case of 802.15.4 sequences, using K=2 results in distances between $X_j$ and $Z_i$ being at least 14. Then, we may seek a set of N/2 alternative sequences such that $$|x_i - x_j| \geq \frac{N}{2} \quad i, j = 1 \ldots N/2, \, i \neq j$$

It turns out that with such relaxation it may be possible to achieve better bit error correction rates than with sequences that are strictly orthogonal. This gives a possibility of choosing a new set of pseudo random noise sequences in a way that may optimize overall performance of the protocol. For example, to improve the bit error rate, the mean mutual distance between $X_i$ may be optimized. That is, the optimization goal may be to find the solution to the maximization condition below.

$$\max_x \frac{1}{N/2} \sum_{i=1}^{N/2} \frac{1}{N/2 - 1} \sum_{j \neq i} |x_i - x_j|$$

However, other methods of optimizing the mean mutual distance between the candidate sequences may be used. It should be noted that a solution of this optimization problem need not be unique, and a plurality of candidate sets of sequences may be found that satisfy these conditions, though only one candidate set of pseudo random noise sequence $X_m$ is selected to serve as the alternate symbol to chip mapping.

2. Preferred Embodiments

Referring now to FIG. 1, there is shown a first method for generating an alternative direct sequence spread spectrum symbol to chip mapping that may be embedded in a transceiver used by a wireless subsystems, which is designated generally by reference numeral 100. In step 1 of method 100, a set of nearly orthogonal pseudo random noise sequences that are used by a standard transmission protocol are identified. In the sample case of the 802.15.4 IEEE standard, the pseudo random noise sequences or chip sequences are defined in the standard. In step 2 of method 100, a plurality of candidate sets that are nearly orthogonal to the pseudo random noise sequences used by a standard protocol. Such a set is capable of being generated because for any chip sequence of length N, N−1 additional mutually orthogonal sequences can be formed. Therefore, if N/2 chip sequences are already defined, it is possible to generate a plurality of alternative candidate sets of N/2 chip sequences that are orthogonal to each other and simultaneously orthogonal to every of N/2 original chip sequences. In the case of 32-chip long sequences as in the 802.15.4 IEEE standard, because the set 16 chip sequences used are only nearly orthogonal to one another, another set of nearly orthogonal chip sequences can be generated, by fixing a desired relaxed orthogonality requirement by selecting K as a small integer, such as 0, 1, or 2, for example.

In step 3 of method 100, at least one of the candidate sets are selected, which serves as the alternative symbol to chip mapping $X_m$. The choice of $X_m$ can be based on the optimization of the candidate sequences $X_i$. A modified transceiver would then use in its symbol-to chip mapping the modified or candidate set of sequences $X_m$ instead of the original sequences $Z_i$. As a result of shared bit error correction characteristics between $X_m$ and $Z_i$, a wireless transmission using the alternative chip sequences would enjoy the same level of noise rejection as the original technique. At the same time, any standard signal using the original sequences could be easily discriminated from signals that use the alternative coding by virtue of mutual orthogonality. The transmitter would then perform CCA based on detection of signals that conform to the new alternative coding format (in addition to energy detection), and would ignore signals conforming to the original standard format. This would significantly reduce CCA vulnerability with respect to interfering sources.

Figure 2:
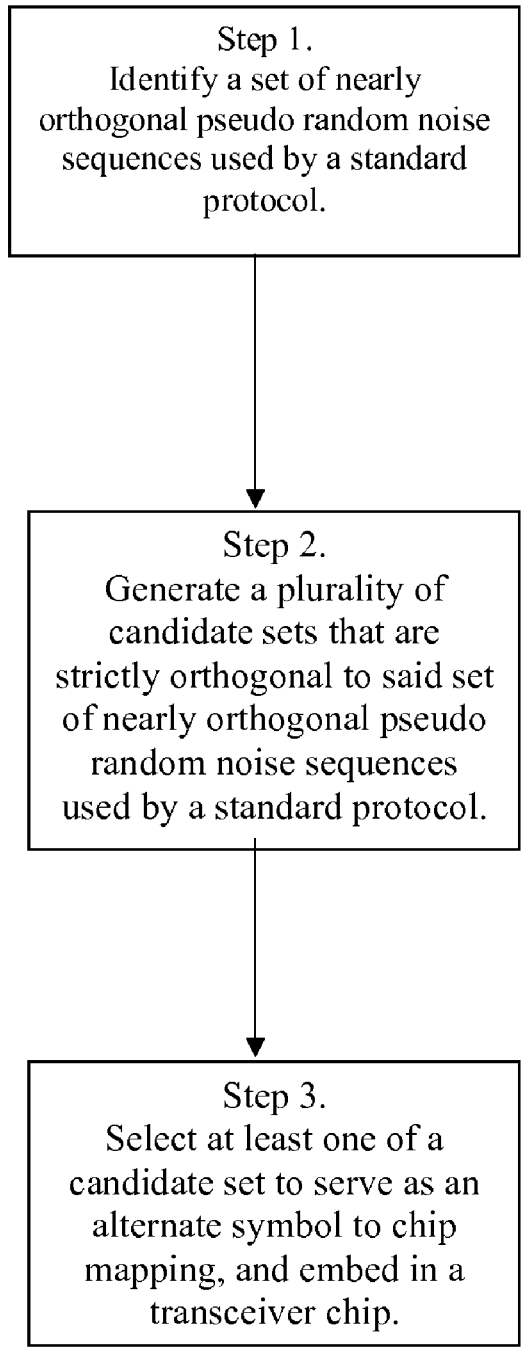
FIG. 2 is a flow chart depicting operative steps of another preferred embodiment of the second method of the present invention.

Referring now to FIG. 2, there is shown a second method for generating an alternative direct sequence spread spectrum symbol to chip mapping that may be embedded in a transceiver used by wireless subsystems, which is designated generally by reference numeral 200. In step 1 of method 200, a set of nearly orthogonal pseudo random noise sequences used by a standard protocol is identified. In step 2 of method 200, a plurality of candidate sets that are strictly orthogonal to said set of nearly orthogonal pseudo random noise sequences used by a standard transmission protocol are generated. This step is a variant of the possible relaxation of the orthogonality requirement. For example, it might be possible to require that new sequences $X_i$ are strictly orthogonal to original sequences $Z_i$ such that the orthogonal distance is defined by $$|x_i - z_j| = \frac{N}{2} \quad i = 1 \ldots N/2, j = 1 \ldots N/2$$

And then, relax the requirement of mutual orthogonality between $X_i$, using the constraint $$|x_i - x_j| \geq \frac{N}{2} - K \quad i, j = 1 \ldots N/2, i \neq j$$

where K is a small positive integer, such as 0, 1, or 2. Compared to the previous relaxation of the first method, this would result in slightly worse error rejection properties, but with better separation between the candidate pseudo random noise sequences $X_i$ and the original nearly orthogonal pseudo random noise sequences $Z_i$ of a standard protocol. Other methods of relaxing orthogonality requirements are also possible.

Finally, in step 3 of method 200, at least one of the possible candidate sets is selected to serve as an alternate symbol to chip mapping.

In a preferred embodiment of the first method 100 described in FIG. 1, N=32 and the desired mean mutual distance is selected such that K=2. In this embodiment, the particular case addressed is the direct spread spectrum transmission, as defined in 802.15.4 IEEE standard. Using the criteria below a number of possible candidates were found.

$$|x_i - z_j| \geq 14 \quad i = 1 \ldots 16, \ i = 1 \ldots 16$$

$$|x_i - x_j| \geq 16 \quad i = 1 \ldots 16, \ i = 1 \ldots 16, i \neq j$$

$$\max_x \frac{1}{16} \sum_{i=1}^{16} \frac{1}{15} \sum_{j \neq i} |x_i - x_j|$$

Figures 3, 4:
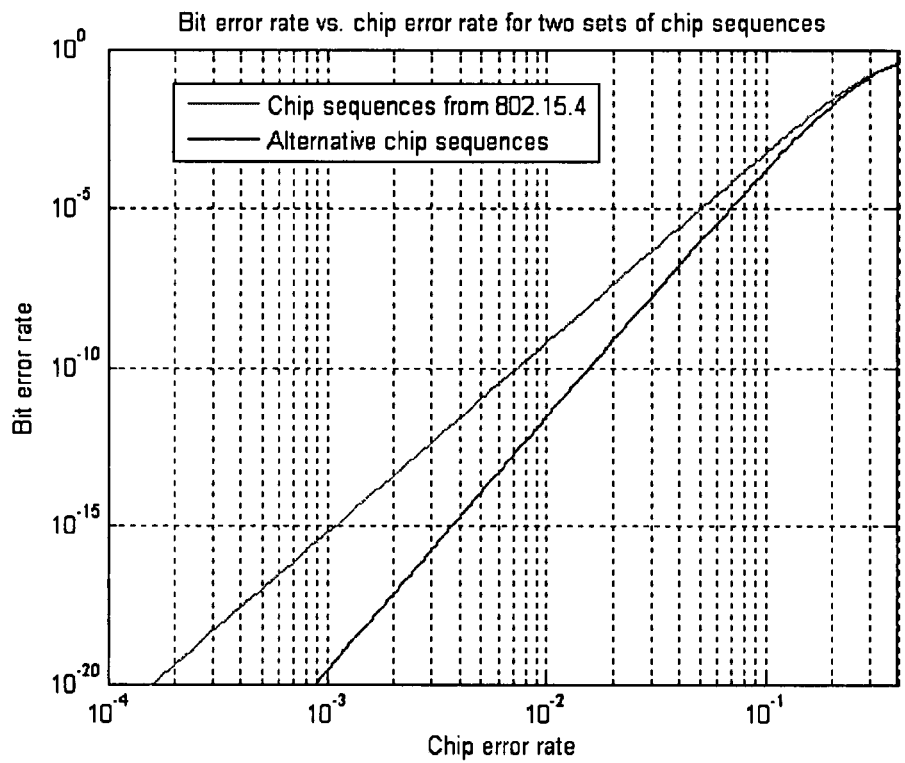
FIG. 3 is a table illustrating a possible alternative symbol-to-chip mapping in accordance with a preferred embodiment of the present invention.
FIG. 4 is a graphical representation of the bit error rate vs. chip error rates for two sets of chips sequences that can be achieved by a preferred embodiment of the first method of the present invention.

By way of an example, one alternate symbol to chip mapping $X_m$ is given in FIG. 3. The mutual distances between different $X_i$ range between a minimum of 16 and a maximum of 22, and the mean mutual distance is equal to 16.983. Note that this is slightly lower than the overall mean mutual distance between the original 802.15.4 sequences $Z_i$, which is equal to 17.067. However, the minimal mutual distance between the new alternative sequences is equal to 16, while for 802.15.4 the minimum mutual distance is 12. This means that the alternative sequences allow perfect error correction of up to 7 chip errors, as opposed to 5 chip errors with the original chip sequences.

As shown in FIG. 3, it is advantageous to arrange the assignment of chip sequences to symbols in such a way that the largest distances between sequences correspond to data symbols with largest number of different bits. This may further improve the overall bit error rate. However, the methods described herein envision that any of the 4-bit sequences shown can be mapped to the selected 16 chip sequences $X_m$, and the invention is not limited only to the pairings depicted in the mapping of FIG. 3, as should be readily understood by those skilled in the art.

Referring now to FIG. 4, there is shown a graphical illustration of the overall bit error rate versus the underlying chip error rate for the original 802.15.4 chip sequences and for the selected pseudo random noise sequences $X_m$ from FIG. 3. The bit error rate was calculated assuming hard decoding of chips. It is seen that the new proposed chip sequences result in bit error rate better by an order of magnitude or more. This is the consequence of the fact that the minimal distance between the new set is 16 as opposed to 12 within the original set, which results in better error rejection.

Some of the benefits of the present invention are that it allows for using most of the already existing infrastructure (e.g. transceiver and other chip designs, medium access control ("MAC") and higher level software, etc.), while only minimal modifications would be needed to physical layer of the transmission protocol. This enables using the entire existing infrastructure of a given standard protocol, of which 802.15.4 IEEE standard is merely one example, and at the same time would separate the modified signals from transmissions using the original standard. The alternative direct sequence spread spectrum symbol to chip mappings and methods for generating described herein provide improvements to the overall robustness and determinism of the wireless system with respect to accidental interference. Moreover, both the alternative symbol to chip mappings achieved from the two methods provide a custom solution that many of the channel overcrowding problems of protocols using clear channel assessment for a very low price.

Although the subject invention has been described with respect to preferred embodiments, those skilled in the art will readily appreciated that changes or modifications thereto may be made without departing from the spirit or scope of the subject invention as defined by the appended claims.

What is claimed is:

1. A method for generating an alternative direct sequence spread spectrum symbol to chip mapping embedded in a transceiver chip for wireless subsystems comprising the steps of:
   a) identifying a set of nearly orthogonal pseudo random noise sequences that are used by a standard transmission protocol;
   b) generating a plurality of candidate sets of pseudo random noise sequences that are nearly orthogonal to said set of nearly orthogonal pseudo random noise sequences that are used by said standard transmission protocol; and
   c) selecting at least one of said plurality of candidate sets of pseudo random noise sequences to serve as an alternative direct sequence spread spectrum symbol to chip mapping, wherein the at least one of said plurality of candidate sets of pseudo random noise sequences selected are embedded in the transceiver chip, wherein the step of identifying a set of nearly orthogonal pseudo random noise sequences comprises identifying a set of N/2 chip sequences $Z_i$ (wherein i=1 . . . N/2) of length N that are used by a direct sequence spread spectrum standard transmission protocol, and wherein the step of generating a plurality of candidate sets of pseudo random noise sequences comprises generating a plurality of candidate sets $X_j$ (wherein j=1 . . . N/2), each consisting of N/2 pseudo random noise sequences of length N such that a mutual mean distance between each of the sequences within said candidate sets satisfies the condition $|X_j - Z_j| \geq N/2 - K$ (wherein i,j=1 . . . N/2, i≠j).

2. The method as recited in claim 1, wherein the step of generating a plurality of candidate sets $X_j$, each consisting of N/2 pseudo random noise sequences of length N, includes the step of defining K as 0, 1 or 2.

3. The method as recited in claim 2, wherein the step of choosing at least one set of pseudo random noise sequences includes choosing a candidate set $X_m$ (wherein m=1 . . . N/2) based on optimizing the mutual mean distance between each of the N/2 chip sequences within the plurality of candidate sets $X_j$.

4. The method as recited in claim 3, wherein the step of generating a plurality of candidate sets $X_j$, each consisting of N/2 pseudo random noise sequences, includes the step of defining N as 32 and K as 2.

5. The method as recited in claim 3, wherein the step of generating a plurality of candidate sets $X_j$, each consisting of N/2 pseudo random noise sequences, includes the step of defining N as 32 and K as 0.

6. The method as recited in claim 4, wherein $X_m$ is selected as:

$$\begin{aligned}X_m = \ &11011100011011110000110100010001\\&10110111110001101100000010110001\\&00001010101110110111000110010101\\&10101011001000111100010101101010\\&10011110111100101011011001000000\\&11110010000100011010111100100101\\&01011101000110011101010010101001\\&01100101101000010110111011000011\\&01010000110011101010011110101010\\&00111011011010000100011000110011\\&10101001110010000001110111001101\\&11000000101111011100101000011110\\&01010101110101010001001111010100\\&11101100000000101001101011110110\\&00000110010111000111110001101110\\&00110011100010110011101001111000.\end{aligned}$$

7. The method as recited in claim 6, wherein said wireless subsystems comprise wireless aircraft subsystems.

8. A method for generating an alternative direct sequence spread spectrum symbol to chip mapping embedded in a transceiver chip for wireless subsystems comprising the steps of:
   a) identifying a set of nearly orthogonal pseudo random noise sequences that are used by a standard transmission protocol;
   b) generating a plurality of candidate sets of pseudo random noise sequences that are strictly orthogonal to said set of nearly orthogonal pseudo random noise sequences that are used by said standard transmission protocol; and
   c) selecting at least one of said plurality of candidate sets of pseudo random noise sequences to serve as an alternative direct sequence spread spectrum symbol to chip mapping, wherein the at least one of said plurality of candidate sets of pseudo random noise sequences selected are embedded in the transceiver chip, wherein the step of identifying a set of nearly orthogonal pseudo random noise sequences comprises identifying a set of N/2 chip sequences $Z_i$ (wherein i=1 . . . N/2) of length N that are used by a direct sequence spread spectrum standard transmission protocol, and wherein the step of generating a plurality of candidate sets of pseudo random noise sequences comprises generating a plurality of N/2 candidate sets $X_j$ (wherein j=1 . . . N/2), each consisting of N/2 pseudo random noise sequences of length N, such that a mutual distance between any two sequences within said candidate sets satisfies the condition $|X_i - X_j| \geq N/2$ (wherein i,j=1 . . . N/2, i≠j).

9. The method as recited in claim 8, wherein the step of generating a plurality of candidate sets $X_j$, each consisting of N/2 pseudo random noise sequences, includes the step of defining N as 32.

10. The method as recited in claim 9, wherein the step of choosing at least one set of pseudo random noise sequences includes selecting a candidate set $X_m$ based on optimizing the mutual mean distance between the N/2 chip sequences within the plurality of candidate sets $X_j$.

11. The method as recited in claim 10, wherein said wireless subsystems comprise wireless aircraft subsystems.

12. A direct sequence spread spectrum symbol to chip mapping embedded in a transceiver chip for wireless subsystems comprising:
  a first set of pseudo random noise sequences that are nearly orthogonal to a second set of nearly orthogonal pseudo random noise sequences used by a standard transmission protocol,
  wherein the first and second set of pseudo random noise sequences are embedded in the transceiver chip,
  wherein the first set of pseudo random noise sequences is 32 bits long, and
  wherein the minimum mutual distance between each pair of sequences in the first set of pseudo random noise sequences is selected.

13. The direct sequence spread spectrum symbol to chip mapping embedded in a transceiver chip for wireless subsystems of claim 12, wherein the minimum mutual distance between each pair of sequences in the first set of pseudo random noise sequences is selected as 14.

14. The direct sequence symbol to chip mapping embedded in a transceiver chip for wireless subsystems of claim 13, wherein the first set of pseudo random noise sequences comprises:

```
11011100011011110000110100010001
10110111110001101100000010110001
00001010101110110111000110010101
10101011001000111100010101101010
10011110111100101011011001000000
11110010000100011010111100100101
01011101000110011101010010101001
01100101101000010110111011000011
01010000110011101010011110101010
00110110111010000100011000110111
10101001110010000001110111001101
11000000101110111001010000111110
01010101110101010001001111010100
11101100000000101001101011110110
00000110010111000111110001101110
00110011100010110011101001111000.
```

15. The direct sequence spread spectrum symbol to chip mapping embedded in a transceiver chip for wireless subsystems of claim 14, wherein the wireless subsystems comprises wireless aircraft subsystems.

16. A direct sequence spread spectrum symbol to chip mapping embedded in a transceiver chip for wireless subsystems comprising:

a first set of pseudo random noise sequences that are strictly orthogonal to a second set of nearly orthogonal pseudo random noise sequences used by a standard transmission protocol, wherein the first and second set of pseudo random noise sequences are embedded in the transceiver chip, wherein the first set of pseudo random noise sequences is 32 bits long, and wherein the minimum mutual distance between each pair of sequences in the first set of pseudo random noise sequences is selected.

17. The direct sequence spread spectrum symbol to chip mapping embedded in a transceiver chip for wireless subsystems of claim 16, wherein the wireless subsystems comprises wireless aircraft subsystems.

* * * * *